(12) United States Patent
Hattori et al.

(10) Patent No.: US 7,151,566 B2
(45) Date of Patent: Dec. 19, 2006

(54) ELECTRONIC CAMERA

(75) Inventors: Yuko Hattori, Takatsu-ku (JP); Hideo Hoshuyama, Takatsu-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/349,090

(22) Filed: Jan. 23, 2003

(65) Prior Publication Data

US 2003/0146989 A1   Aug. 7, 2003

(30) Foreign Application Priority Data

Feb. 1, 2002   (JP) .............................. 2002-025713

(51) Int. Cl.
  *H04N 5/202* (2006.01)
  *G03F 3/08* (2006.01)
(52) U.S. Cl. ...................... 348/254; 348/255; 358/518
(58) Field of Classification Search ........ 348/362–366, 348/254, 255, 361, 234; 382/169, 274, 168; 358/453, 518
See application file for complete search history.

(56) References Cited

U.S. PATENT DOCUMENTS 5,517,333 A * 5/1996 Tamura et al. .............. 358/518
5,818,528 A * 10/1998 Roth et al. .................. 348/364
5,896,463 A * 4/1999 Kuhn .......................... 382/133
6,023,533 A * 2/2000 Sano et al. .................. 382/274
6,080,104 A * 6/2000 Ozawa et al. ............... 600/180
6,806,903 B1 * 10/2004 Okisu et al. ................. 348/254

FOREIGN PATENT DOCUMENTS

| JP | 07-249101 | * 9/1995 |
| JP | 09037145 | 2/1997 |
| JP | 2002-295477 | 10/2000 |
| JP | A 2001-54014 | 2/2001 |
| JP | 2001-1155143 | 6/2001 |
| WO | WO 96/16534 | 6/1996 |

* cited by examiner

*Primary Examiner*—Lin Ye
(74) *Attorney, Agent, or Firm*—Oliff & Berridge, PLC

(57) ABSTRACT

The objects of the present invention are to provide an electronic camera which is able to precisely evaluate the type of a subject and perform an optimal gray-scale transformation on the image of the subject. The electronic camera comprises: an histogram creation unit for creating an intensity histogram of an image obtained with an image sensor; and a setting unit for setting a gray-scale transformation characteristic to be applied to the image according to the created intensity histogram. Using the created histogram makes it possible to precisely evaluate the type of the subject and set an optimal gray-scale transformation characteristic.

6 Claims, 6 Drawing Sheets

ELECTRONIC CAMERA

BACKGROUND OF THE INVENTION

1. Field of the Invention

The present invention relates to an electronic camera which has a function of automatically setting a gray-scale transformation characteristic depending on the type of an image.

2. Description of the Related Art

An electronic camera of a type, which obtains an image with image sensors, performs gray-scale transformation on an image outputted from the image sensors. Performing this gray-scale transformation makes it possible to offset the characteristics (inclination) of the image sensor, and to adjust the image according to the display characteristics of a monitor as a general display device. It also enables transformation of an undesirable image to a desirable image.

The electronic camera, however, may perform an unsuitable gray-scale transformation on particular images. In some case, when the gray-scale transformation is performed on a subject image having a wide range of intensity, for example, a dark portion of the image may appear inky black or a bright portion of the image may appear stark white. For other cases, when the gray-scale transformation is performed on a subject image having a small range of intensity, the image may lose distinctiveness in brightness.

Japanese Unexamined Patent Application Publication No. 2001-54014 discloses a technique for determining the type of a subject from an output of a split photometric sensor to automatically set an optimal gray-scale transformation characteristic in accordance with the type of the subject. Even by this technique, however, there are images of some subject (namely, subject with luminescent or black spots) on which the gray-scale transformation cannot be executed with a user-satisfying level.

SUMMARY OF THE INVENTION

Accordingly, the object of the present invention is to provide an electronic camera which is capable of more precisely evaluating the type of a subject to perform an optimal gray-scale transformation on the image of the subject.

To achieve the object, the electronic camera of the present invention comprises a histogram creation unit for creating an intensity histogram for an image obtained with an image sensor, and a setting unit for setting a gray-scale transformation characteristic for the image according to the created intensity histogram.

According to this intensity histogram, it is possible to precisely evaluate the type of a subject and thereby set an optimal gray-scale transformation characteristic. The histogram creation unit preferably weights, for the creation of the intensity histogram, a frequency at which each level of intensity is found in the image depending on which position in the image the intensity level is found at. The weighting as above allows the creation of the intensity histogram which reflects the type of the subject more properly.

Further, it is preferable that the setting unit set the gray-scale transformation characteristic according to only a main portion of the intensity histogram, which signifies a portion excluding a portion in a high intensity range thereof and a portion in a low intensity range thereof, the portions in the high and low intensity ranges being portions in which a total of values of frequencies is a predetermined value. This exclusion makes it possible to apply an optimal gray-scale transformation to the image in accordance with the main portion of the subject. The setting unit may preferably perform the setting according to a contrast of the image which is indicated in the intensity histogram. This enables the precise setting of the gray-scale transformation characteristic according to the type of the subject.

In addition, the histogram creation unit preferably evaluates, for the creation of the intensity histogram, each level of intensity in every small area of the image. The small area each consists of a plurality of pixels. The evaluation for each small area realizes a reduction in data amount of the intensity histogram. The histogram creation unit also performs logarithmic transformation on the intensity for the creation of the intensity histogram. This simplifies the setting unit's analysis of the intensity histogram.

Further, the histogram creation unit comprises a plurality of lookup tables for logarithmic transformation which correspond to a plurality of intensity levels, and it performs the logarithmic transformation by selectively using the lookup tables in accordance with a level of a pre-transformation intensity. Using the plurality of lookup tables as described above achieves executing the logarithmic transformation with high precision and high speed.

As described above, the present invention realizes the electronic camera which can precisely evaluate the type of a subject to apply an optimal gray-scale transformation characteristic to the image of the subject.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

In the following the embodiments of the present invention will be described in reference to the drawings.

Figure 1:
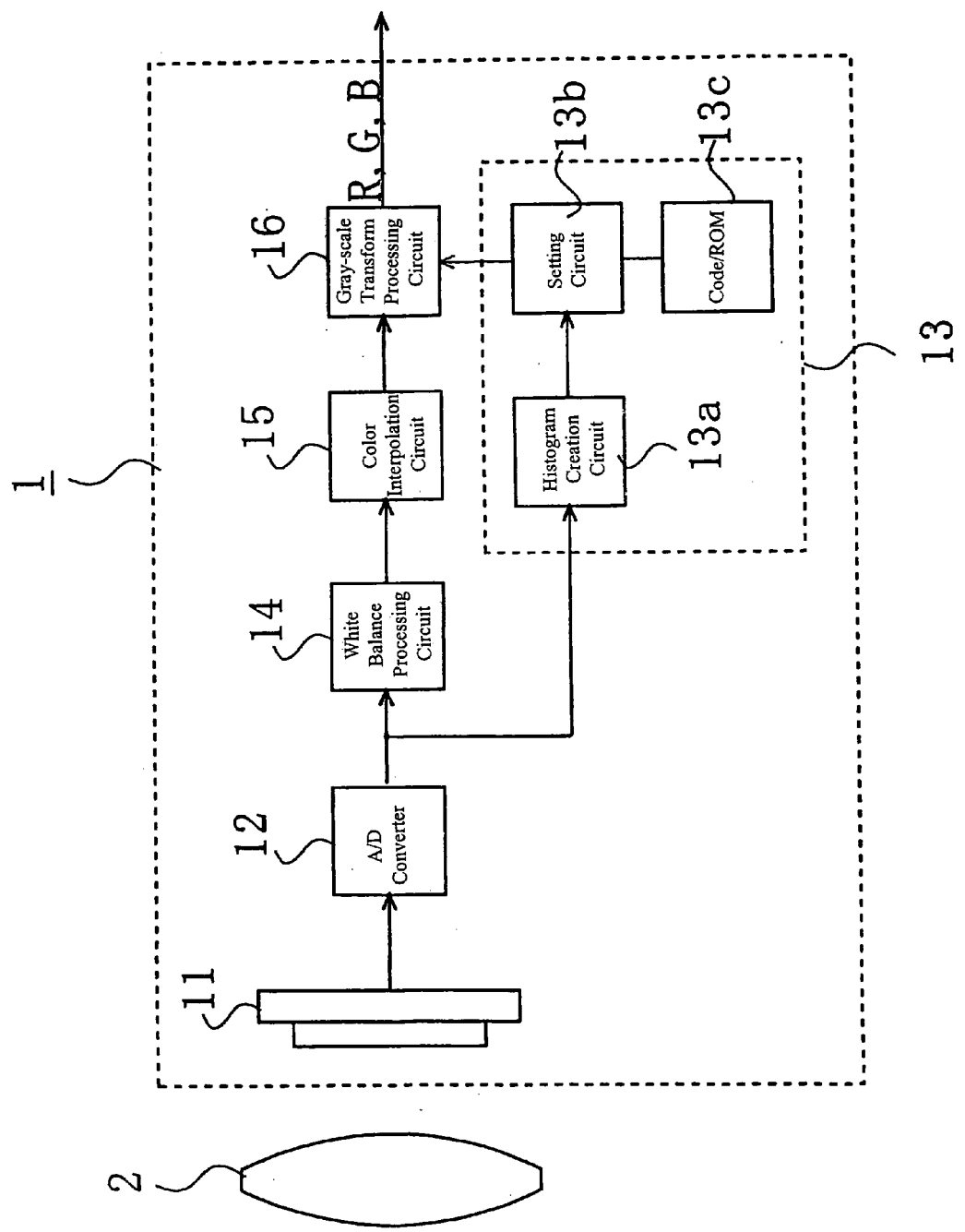
FIG. 1 shows the basic configuration of the electronic camera according to the present embodiments.

FIG. 1 shows the basic configuration of the electronic camera according to the present embodiments.

A camera body 1 includes an image sensor 11, an A/D converter 12, a white balance processing circuit 14, a color interpolation circuit 15, a gray-scale transformation processing circuit 16, a transformation characteristic setting circuit 13 and others.

An image of a subject is formed on the image sensor 11 through lens 2. An output signal from the image sensor 111 is inputted to the A/D converter 12 via a not-shown analog gain controller and converted into a digital signal therein. On the digital signal performed are white balance processing by the white balance processing circuit 14, color interpolation processing by the color interpolation circuit 15, and gray-scale transformation processing by the gray-scale transformation processing circuit 16.

Note that the transformation characteristic setting circuit 13 sets a gray-scale transformation characteristic of the gray-scale transformation processing circuit 16, and the transformation characteristic setting circuit 13 represents the characteristics of the present invention.

Figure 2:
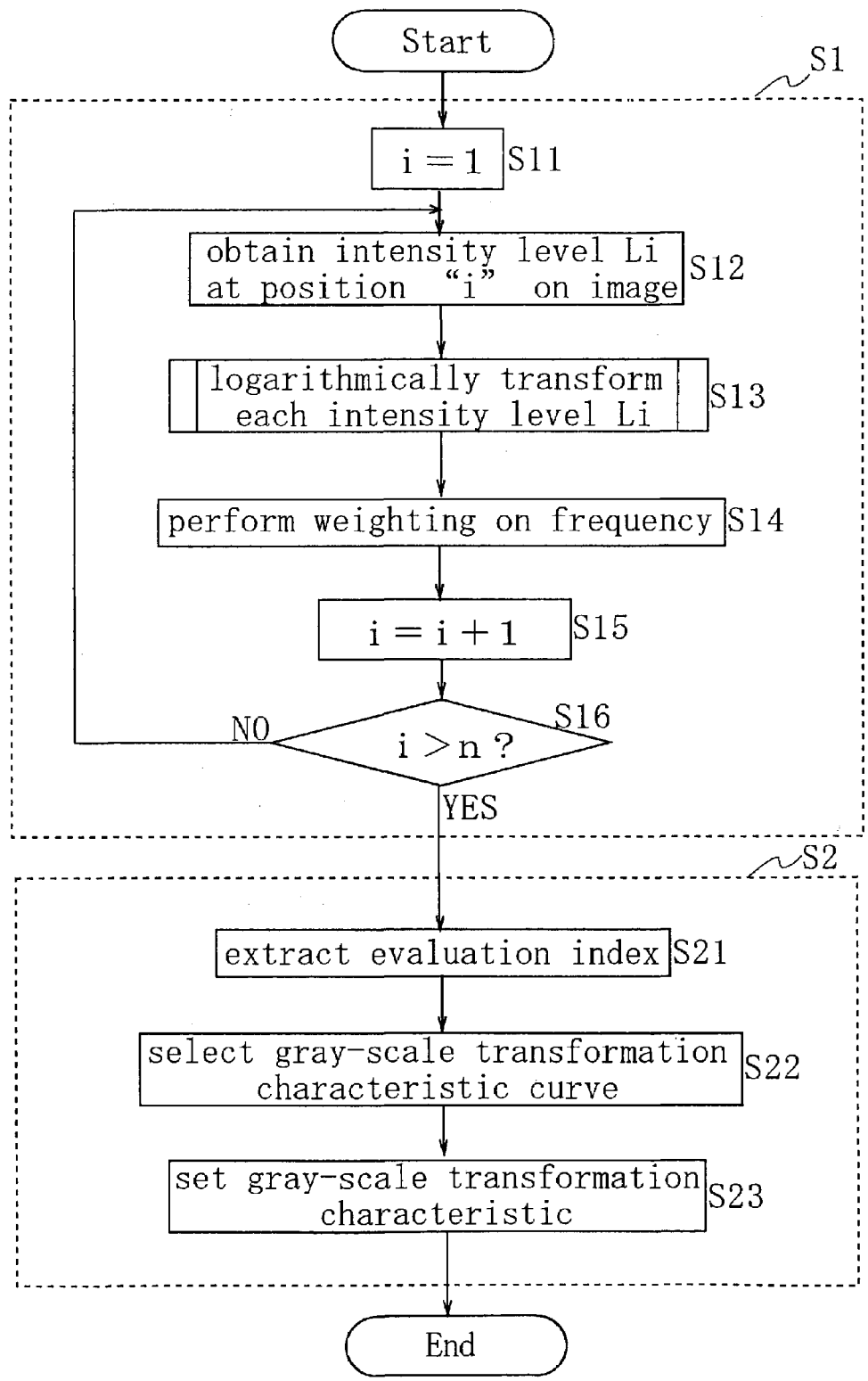
FIG. 2 is an overall operational flowchart of the transformation characteristic setting circuit 13.
Figure 3:
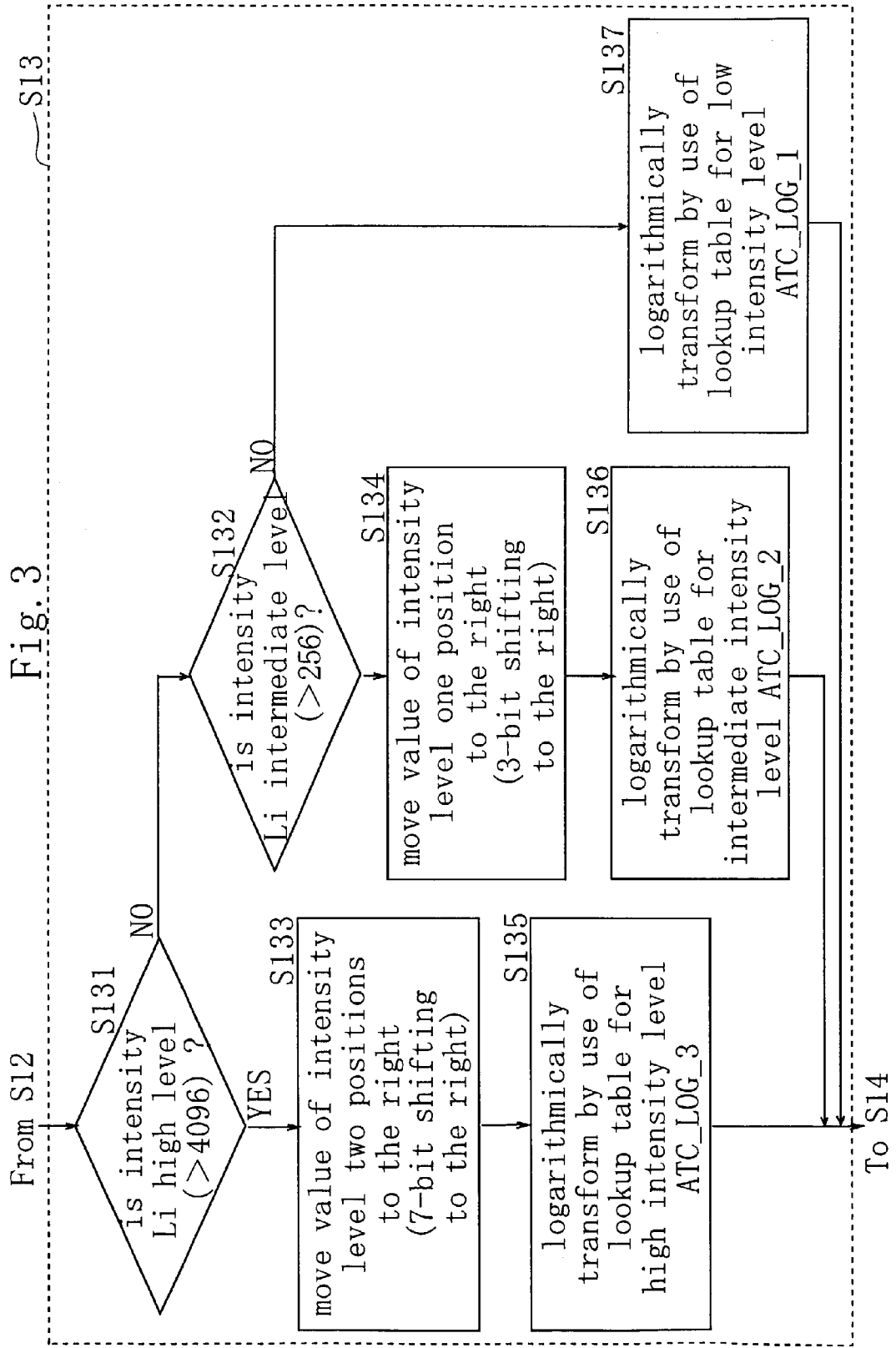
FIG. 3 is an operational flowchart explaining S13 in FIG. 2.

FIGS. 2 and 3 are operational flowcharts of the transformation characteristic setting circuit 13. FIG. 2 is the overall flowchart while FIG. 3 explains step S13 in FIG. 2.

In step S1 of FIG. 2, referring to an image obtained with the image sensor 11, the transformation characteristic setting circuit 13 creates an intensity histogram of the image.

In step S2, the transformation characteristic setting circuit 13 determines a gray-scale transformation characteristic according to the created intensity histogram and sets the gray-scale transformation processing circuit 16 to have the determined characteristic.

It should be noted that a histogram creation circuit 13a and a gray-scale transformation characteristic curve setting circuit 13b illustrated in the transformation characteristic setting circuit 13 in FIG. 1 take charge of executing step S1 and step S2, respectively. Also, the code 13c is a code for ROM for storing a gray-scale transformation characteristic curve (table) to be set in the gray-scale transformation processing circuit 16. The ROM 13c stores a plurality of the tables therein, and the gray-scale transformation characteristic curve setting circuit 13b selects one of the tables to set the gray-scale transformation processing circuit 16 to have the selected table.

First, an intensity histogram creation procedure will be described in reference to step S1 in FIG. 2.

The transformation characteristic setting circuit 13 obtains, as data for creation of the intensity histogram, intensity level Li (i=1~n) at each position "i" (i=1~n) in the image from outputs of the A/D converter 12 (S12 in FIG. 2), and performs a logarithmic transformation on each of the obtained intensity levels Li (i=1~n) (S13 in FIG. 3).

Figure 4:
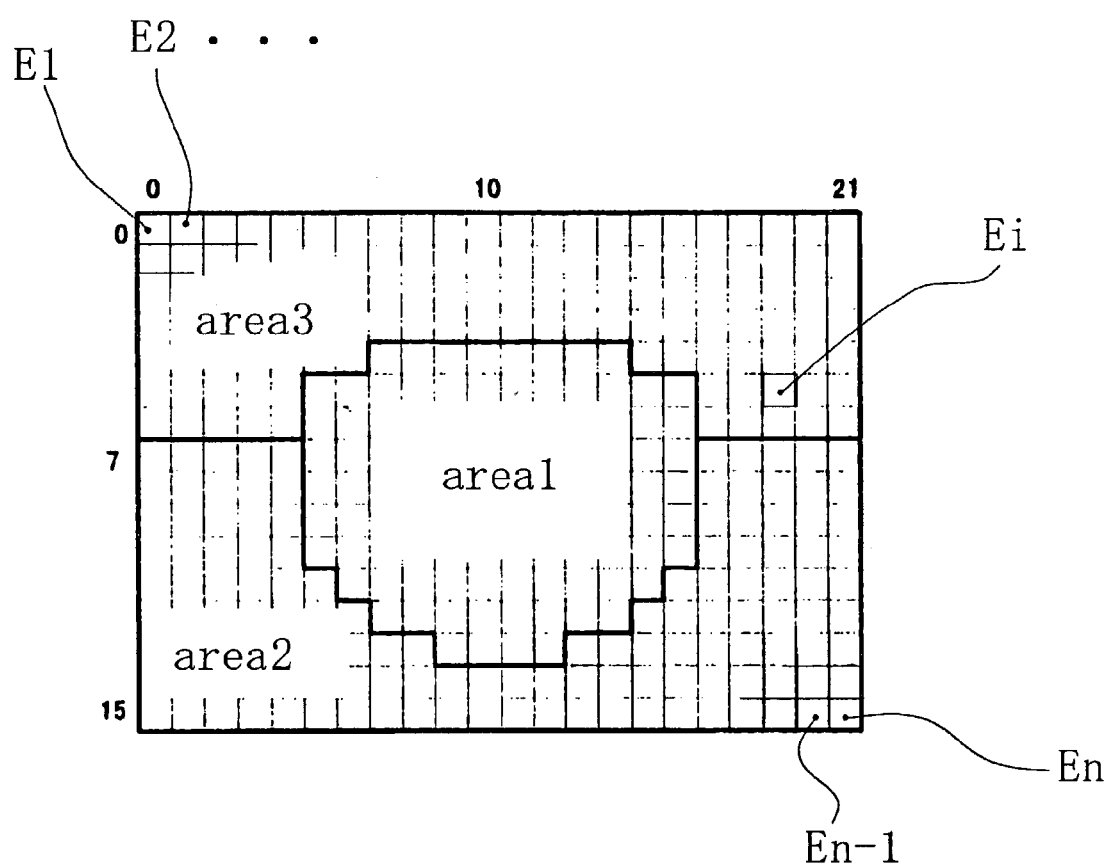
FIG. 4 illustrates small areas Ei and areas in the image.

Here in step S12, each intensity level Li in the image is obtained in every small area Ei (i=1~n) shown in FIG. 4. Each small area Ei (i=1~n) consists of a plurality of pixels, and the intensity level Li is defined as, for example, an average (or total) of intensity levels of the plurality of pixels in the small area Ei. Evaluating each intensity level in every small area of the image as above can reduce data amounts needed for creation of the intensity histogram, thereby shortening the time necessary for performing logarithmic transformation. This also reduces data amounts of the intensity histogram, resulting in reducing the size of a memory in which the intensity histogram is to be stored.

In addition, the reasons for which each intensity level Li (i=1~n) has to be logarithmically transformed (S13 in FIG. 2) are as follows. Namely, the intensity level Li (i=1~n) in logarithm can be obtained by simply adding and subtracting exponents unlike that not in logarithm need be obtained by multiplication and division. This way of calculation of the intensity in logarithm accordingly simplifies analyzing (extraction of evaluation index to be described later) of the intensity histogram.

Next, the logarithmic transformation (S13 in FIG. 2, FIG. 3) according to the present embodiments is executed by use of a lookup table (in this case, lookup table for logarithmic transformation). It should be noted that the logarithmic transformation can be logically performed by arithmetic operation without using the lookup table, however, it takes a lot of time; especially, for a detailed intensity histogram a large number "n" of small areas Ei have to be used, substantially increasing a time taken for the calculation. As described above, by using the lookup table, it is possible to shorten the processing time for the logarithmic transformation.

Figure 5:
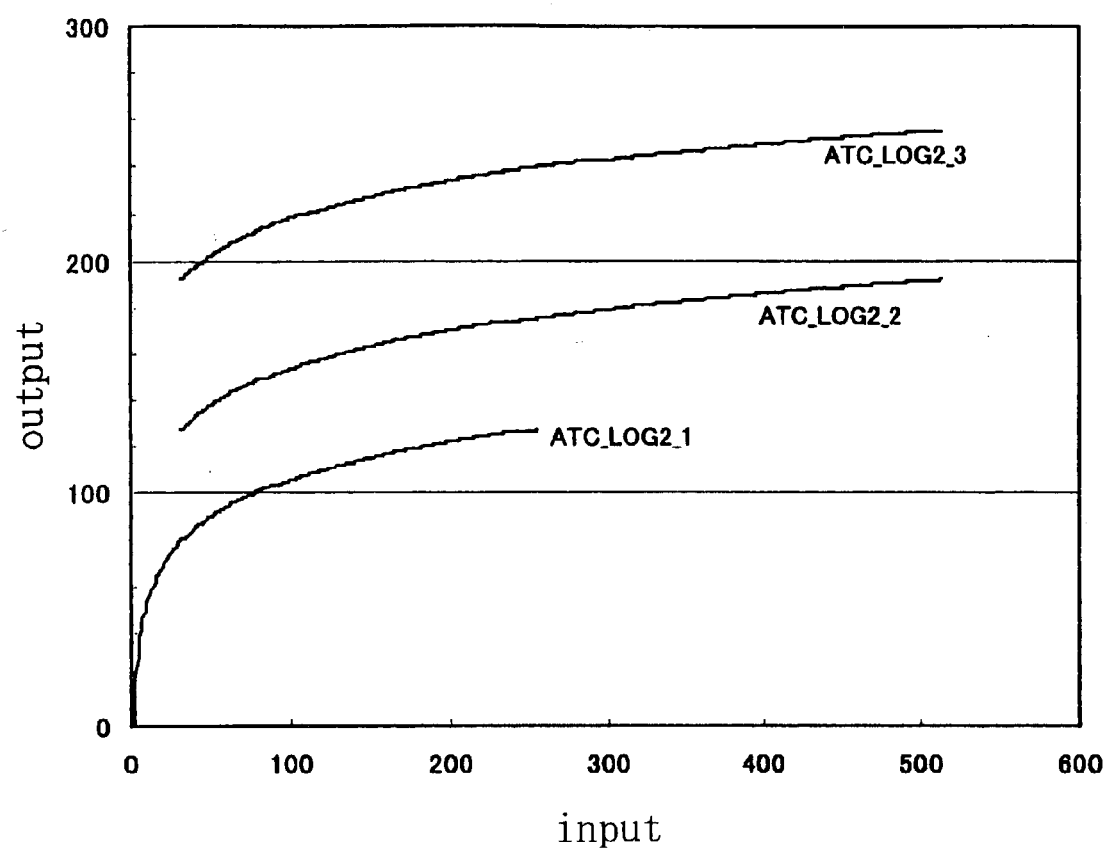
FIG. 5 shows an example of the plurality of lookup tables used in the present embodiments.

Further, the logarithmic transformation (S13 in FIG. 2, FIG. 3) according to the present embodiments is executed by use of not a single lookup table but a plurality of lookup tables (for instance, the ones shown in FIG. 5). These lookup tables are prepared for a plurality of levels of intensity, respectively. The plurality of lookup tables are used because using only a single lookup table is disadvantageous in that it requires the setting of an extremely large input range of the lookup table (a large increase in the input range substantially increases a time necessary for executing logarithmic transformation), or it needs to adapt a complex way of processing as thinning out data to be inputted to the lookup table first for logarithmic transformation and then interpolating the transformed data. This deteriorates the transformation precision, besides the logarithmic transformation curve is a curve of an index function so that the deterioration will be serious. Therefore, the plurality of lookup tables are used for the purpose of maintaining both a speed of and precision in the logarithmic transformation.

In FIG. 5 shown are three lookup tables, ATC_LOG2_1, ATC_LOG2_2, and ATC_LOG2_3 which are prepared for three intensity levels, low (~256), intermediate (256~4096), and high (4096~), respectively. When the intermediate-level lookup table ATC_LOG2_2 and high-level lookup table ATC_LOG2_3 are used, the level Li of pre-transformation intensity is adjusted to fit in their respective input ranges. In FIG. 3, for example, when the pre-transformation intensity Li is of the intermediate level (256~4096) (that is, NO in step S131 and YES in step S132), the value of the intensity level Li is moved one position to the right (3-bit shifting to the right) (in step S134) before the lookup table ATC_LOG2_2 is used (step S136).

When the pre-transformation intensity Li is of the high level (4096~) (YES in step S131), the value of the intensity level Li is moved two positions to the right (7-bit shifting to the right) (in step S133) before the lookup table ATC_LOG2_3 is used (step S135).

On the other hand, when the pre-transformation intensity Li is of the low level (0~256) (NO in step S131 and No in step S132), the lookup table ATC_LOG2_1 is used without the position of the value of pre-transformation intensity level Li being moved (step S137).

Using the three lookup tables ATC_LOG2_1, ATC_LOG2_2, and ATC_LOG2_3 results in increasing the input range thereof 60,000 times larger than using a single lookup table of the same size, with almost no increase in the time needed for the transformation (step S13 in FIG. 2, FIG. 3).

As apparent from FIG. 5, respective output values of the lookup tables ATC_LOG2_1, ATC_LOG2_2, ATC_LOG2_3 are distributed in the whole output range thereof without overlapping each other, with their magnitude relation maintained.

Next, a weight is given to the above logarithmically transformed intensity level Li in accordance with which area of the image the small area Ei (refer to FIG. 4), in which the intensity level Li is found, is located in (step S14 in FIG. 2). For example, the main portion of the subject is usually located at the center of the image, therefore, when the small area Ei is located at the center (area 1 in FIG. 4), a large weight is given to the intensity level Li thereof. When the small area Ei is located at the positions other than the center (areas 2, 3 in FIG. 4), a small weight is given to the intensity level Li.

Note that the intensity level Li here is expressed in logarithm so that what needed for giving the weight is simply adding a value corresponding to the weighting ratio to the intensity level Li. Weighting the intensity level Li in this way enables the type of the subject to be properly reflected in the intensity histogram.

Performing the above steps S12, S13, and S14 for all of the positions "i" (i=1~n) (YES in step S16) completes the creation of the intensity histogram (completion of step S1 in FIG. 2).

Figure 6:
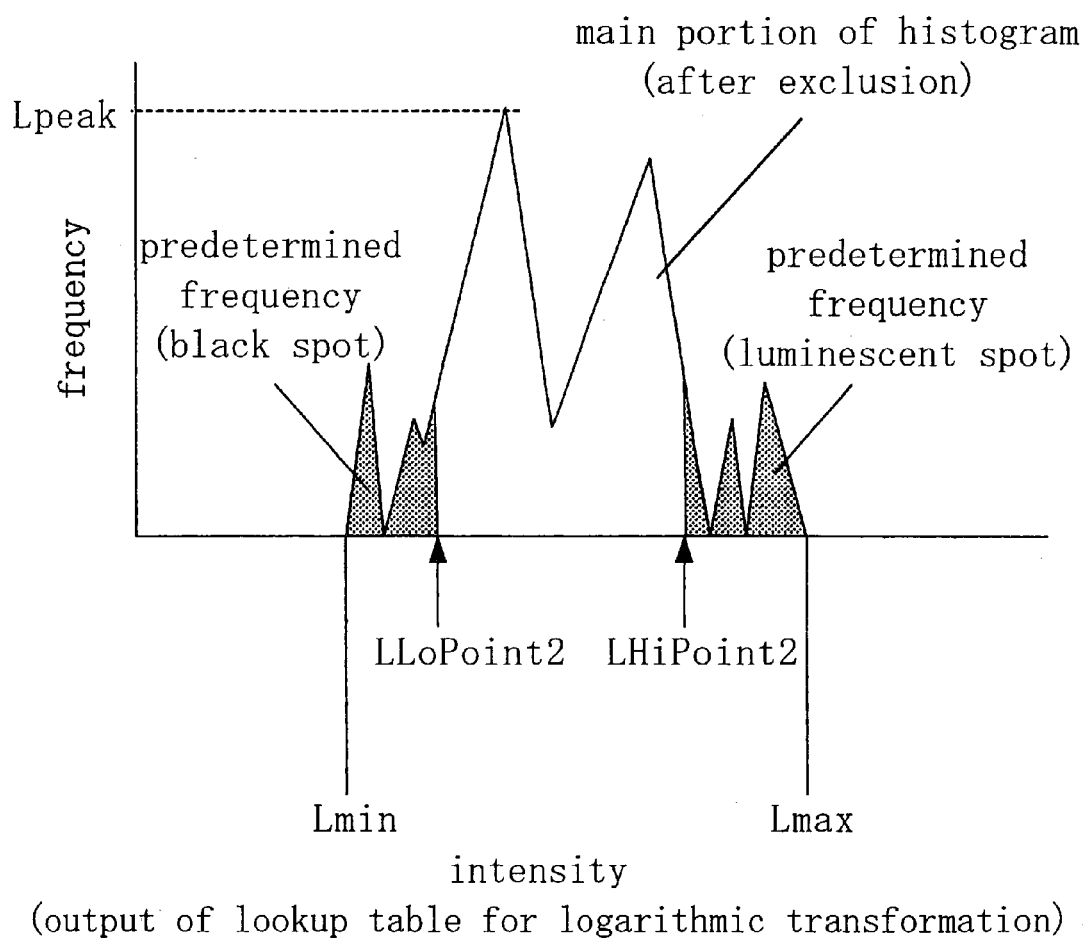
FIG. 6 shows an example of the intensity histogram created according to the present embodiments.

FIG. 6 shows an example of the intensity histogram created in the present embodiments.

In this embodiment an evaluation index is extracted from the intensity histogram (step S21 in FIG. 2). In the prior art (Japanese Unexamined Patent Application Publication Number 2001-54014, for instance), an evaluation index is determined not according to a frequency at which the intensity level is found in the image but according to the intensity range of an image, so that the evaluation index does not always reflect the type of the subject with precision.

On the contrary, the evaluation index of the present embodiments, which is extracted from the intensity histogram (i.e., intensity and frequency) can reflects the type of the subject precisely.

Next, there will be considered of luminescent spots and black spots in the image affecting the evaluation index.

In the intensity histogram of FIG. 6, a dotted area adjacent to the maximum intensity L max corresponds to the luminescent spots in the image. The dotted area is a comparatively low frequency area. Another dotted area adjacent to the minimum intensity L min, which is also a comparatively low frequency area, corresponds to the black spots in the image.

In case that the intensities of these luminescent and black spots are reflected in the evaluation index, erroneous recognition of the type of the subject may occur as a dark main portion of the subject is evaluated as bright or a bright main portion evaluated as dark. That is, the luminescent and black spots may have a negative influence on the evaluation index.

In the present embodiments, in order to prevent the intensities of the luminescent and black spots from affecting the evaluation index, from the intensity histogram of the evaluation object excluded are a portion in the high intensity range thereof (Lmax~LHiPoint2) and a portion in the low intensity range thereof (Lmin~LLoPoint2) both in which the total of values of frequencies is a predetermined value. Only one of the portions may be excluded in order to prevent either of the luminescent and black spots from affecting the evaluation index. As described above, the intensity histogram corresponding to the main portion of the subject (excluding the luminescent and black spots) is regarded as an evaluation object in the present embodiments.

Next, it is assumed that an intensity range after the exclusion is to be from LLopoint2 to LHiPoint2 and the peak of the intensity histogram is to be Lpeak. The evaluation index is defined as {ck×(LHiPoint2−LLopoint2)/Lpeak}, for example ("ck" is a constant). The evaluation index here represents a contrast of the main portion of the subject. The contrast is an index signifying not only the intensity range of the subject (the main portion of the subject in the embodiments) but also the magnitude of the intensity thereof. Therefore, the contrast precisely reflects the type of the subject (the main portion in the embodiments).

The transformation characteristic setting circuit 13 selects, according to the evaluation index, any of a plurality of gray-scale transformation characteristic curves (tables) stored in the ROM 13c (S22 in FIG. 2) and it sets the gray-scale transformation processing circuit 16 to have the selected curve (S23 in FIG. 2).

The transformation characteristic setting circuit 13 of the present embodiments is able to precisely evaluate the type of the subject according to the intensity histogram of the image (steps S12, 513, S14, S15, S16, S21 in FIG. 2) and to set an optimal gray-scale transformation characteristic in accordance with the evaluation result (S22, S23 in FIG. 2). Consequently, the camera body 1 (refer to FIG. 1) having this transformation characteristic setting circuit 13 mounted therein is capable of performing an optimal gray-scale transformation on the image.

Note that the electronic camera to which all of the following procedures (1) to (6) are applied has been described, however, the electronic camera can be configured without all or part of the procedures (2) to (6) being applied thereto. Needless to say that the more procedures applied to, the higher performance the electronic camera will have.

(1) Setting a gray-scale transformation characteristic according to the intensity histogram of the image. (2) For creation of the intensity histogram weighting a frequency at which each level of intensity is found in the image, in accordance with a position in the image at which the intensity level is found. (3) Setting the gray-scale transformation characteristic according to only a main portion of the intensity histogram, the main portion referring to a portion excluding a portion in a high intensity range thereof and a portion in a low intensity range thereof, the portions in the high and low intensity ranges being portions in which a total of values of frequencies is a predetermined value. (4) Setting a gray-scale transformation characteristic according to the contrast of the image represented in the intensity histogram. (5) For creation of the intensity histogram, evaluating each level of intensity in every small area of the image, the small area consisting of a plurality of pixels. (6) Logarithmically transforming the intensity for creation of the intensity histogram.

In the above description, for example, the intensity ranges corresponding to the luminescent and black spots are excluded, however, this exclusion processing is omittable. An electronic camera in which the evaluation index is directly extracted from the intensity histogram may be configured. This electronic camera allows the effects of the luminescent and black spots but it is also capable of more precisely evaluating the type of the subject than the conventional electronic camera because the setting of the gray-scale transformation characteristic is done according to the intensity histogram.

The invention is not limited to the above embodiments and various modifications may be made without departing from the spirit and scope of the invention. Any improvement may be made in part or all of the components.

What is claimed is:

1. An electronic camera that images an image of a subject with an image sensor, comprising:
   a histogram creation unit creating an intensity histogram, with a whole image as its population by weighting a frequency of each intensity in the image according to a position in the image;
   a storage unit storing beforehand a plurality of types of gray-scale transformation characteristics; and
   a setting unit setting a gray-scale transformation characteristic which is to be applied to the same image as the image that had the intensity histogram created, by evaluating a type of the subject shown in the whole image according to the created intensity histogram with the whole image as its population, and selecting a gray-scale transformation characteristic optimal for the image of the subject, out of the plurality of types of gray-scale transformation characteristics, according to the evaluation.

2. The electronic camera according to claim 1, wherein said setting unit performs the evaluation according to only a main portion of the intensity histogram, the main portion referring to a portion excluding a portion in a high intensity range thereof and a portion in a low intensity range thereof, the portions in the high and low intensity ranges being portions in which a total of values of frequencies is a predetermined value.

3. The electronic camera according to claim 2, wherein said setting unit performs the evaluation according to a contrast of the image, the contrast being indicated in said intensity histogram.

4. An electronic camera that images an image of a subject with an image sensor, comprising:
a histogram creation unit creating an intensity histogram which divides an image into small areas and taking an intensity of each small area as a sample, said image as a whole being its population;
a storage unit storing beforehand a plurality of types of gray-scale transformation characteristics; and
a setting unit setting a gray-scale transformation characteristic which is to be applied to the same image as the image that had the intensity histogram created, by evaluating a type of the subject shown in the whole image according to the created intensity histogram with the whole image as its population, and selecting a gray-scale transformation characteristic optimal for the image of the subject, out of the plurality of types of gray-scale transformation characteristics, according to the evaluation.

5. The electronic camera according to claim 4, wherein said histogram creation unit creates the intensity histogram by logarithmically transforming the each level of intensity.

6. The electronic camera according to claim 5, wherein said histogram creation unit has a plurality of lookup tables for logarithmic transformation, and performs the logarithmic transformation by selectively using the plurality of lookup tables in accordance with a level of a pre-transformation intensity, the plurality of lookup tables for logarithmic transformation corresponding to a plurality of levels of intensity.

* * * * *